United States Patent [19]  [11] 3,938,112
Gee  [45] Feb. 10, 1976

[54] TUBULAR WHEEL SPEED SENSOR
[75] Inventor: Thomas A. Gee, Allen Park, Mich.
[73] Assignee: Eaton Corporation, Cleveland, Ohio
[22] Filed: Apr. 12, 1974
[21] Appl. No.: 460,325

[52] U.S. Cl. ........ 340/195; 188/181 R; 303/21 CE; 324/173; 340/62; 340/263
[51] Int. Cl.² ........................................ G08C 19/12
[58] Field of Search ........... 340/195, 197, 198, 199, 340/62; 324/167, 173, 174, 179; 303/21 A, 21 CE, 21 BE, 21 EB

[56] References Cited
UNITED STATES PATENTS

| 2,941,120 | 6/1960 | Harman et al. | 317/5 |
| 3,020,527 | 2/1962 | Mac Laren | 340/196 |
| 3,551,712 | 12/1970 | Jones et al. | 310/67 |
| 3,854,556 | 12/1974 | Gee | 188/181 R |

Primary Examiner—John W. Caldwell
Assistant Examiner—James J. Groody
Attorney, Agent, or Firm—Teagno & Toddy

[57] ABSTRACT

A rotation indication system having an improved sensing device for determining the velocity of a rotating body is disclosed. The improved sensing device is tubular in configuration and includes a source of magnetic flux and two pole pieces that define a split magnetic field. The sensing device is mounted in close proximity to a rotor which is connected to the rotating body. The rotor has apertures which interrupt the split magnetic field producing an output signal with a frequency proportional to the velocity of the rotating body. The sensing device is oriented relative to the rotor apertures so that each pole piece is alternatively in register with an aperture to produce the desired output signal. Since the sensing device is tubular in shape, it can be rotated about its axis to obtain the desired orientation with the rotor apertures, thus permitting the use of the sensing device with a wide range of rotor diameters having various aperture spacings.

10 Claims, 8 Drawing Figures

TUBULAR WHEEL SPEED SENSOR

BACKGROUND OF THE INVENTION

1. Field of the Invention

This invention relates generally to a sensing device which, in conjunction with a rotor that is connected to a rotating body, is used to determine the velocity of the body, and more particularly to a sensing device that can be used with rotors of different sizes or configurations.

2. Description of the Prior Art

Numerous sensing devices have been developed for determining the angular velocity of a rotating body. Most of these devices employ an electromagnet which produces a magnetic field. This field is interrupted by teeth, apertures, or ripples on a rotor which is synchronized with and/or connected to the rotating body. Such interruptions produce a magnetic flux change which is used to induce an output signal with a frequency proportional to the angular velocity of the rotating body. Since these devices are dependent solely on flux change for generation of an output signal, it is imperative that the flux change resulting from the rotation of the rotor be significantly larger than any flux change resulting from axial movement of the rotor relative to the sensing device. In essence, a high signal-to-noise ratio is required to obtain an accurate indication of the angular velocity of the rotating body.

A typical application requiring such a high signal-to-noise ratio is an anti-skid system for automotive and truck vehicles. In such systems, the sensing device generates a signal with a frequency that is proportional to the angular velocity of the vehicle wheel. This signal is then utilized in an electrical control circuit which, through mechanical means, regulates the application of the vehicle brakes. In this type of system, it is imperative that the signal generated by the sensing device be an accurate representation of the wheel velocity so that a skid condition can be detected and immediately corrected. Such accuracy is dependent upon a high signal-to-noise ratio.

Obtaining a high signal-to-noise ratio has been a particularly troublesome problem with these sensing devices, especially in an anti-skid system environment. Some axial movement of the rotor relative to the sensing device is always present due to inherent dimensional variations between the wheel, axle, rotor and sensing device and vibratory movement of these components. Various approaches have been used to overcome or minimize this problem, such as by using components manufactured to close tolerance or by employing elaborate sensor mounting techniques. These approaches are very costly and have not been satisfactory.

Another problem with these sensing devices is that, in general, they can only be used with one configuration of rotor tooth or aperture spacing. Since the pole pieces in the sensing devices are spaced relative to each other so as not to be in register simultaneously with the rotor teeth or apertures, the spacing between pole pieces is directly related to rotor tooth or aperture spacing. Thus, if a different rotor diameter is used which has a different tooth or aperture spacing, another sensing device, with the proper pole spacing, must be installed. Because of this, a multiplicity of sensing devices with different pole piece spacings is required to cover a range of rotor diameters. Such a family of sensing devices is costly to tool for production and results in a higher unit manufacturing cost than if one sensing device could be used for a plurality of rotor tooth or aperture spacings.

Because of the aforementioned problems, it has become desirable to find a sensing device that can be used with a variety of rotor tooth or aperture spacings and provides a high signal-to-noise ratio.

SUMMARY OF THE INVENTION

The present invention provides a solution to the abovedescribed problem of low signal-to-noise ratio and the lack of adaptability of the sensing device to various rotor tooth or aperture spacings by using a tubular housing for the sensing device. The use of such a housing permits both axial and angular adjustment of the sensing device relative to the rotor to obtain proper orientation of the sensing device so that the pole pieces are not simultaneously in register with the rotor teeth or apertures. In essence, angular movement of the tubular sensing device changes the effective distance between pole pieces so that it may coincide with the rotor tooth or aperture spacing, thus permitting the use of the sensing device with a plurality of rotor tooth or aperture spacings.

In one embodiment, the rotor has equally spaced apertures, in the form of holes, on two diameters. The apertures on one diameter are staggered with respect to those on the other diameter, however, the distances between an aperture on one diameter and an adjacent aperture on the second diameter are equal. In another embodiment of the invention, the rotor apertures are elongated slots centered on one diameter, each slot being centrally located on an axis which intersects the center of the rotor. Both embodiments permit the proper orientation of the sensing device relative to the rotor so that the pole pieces are not in simultaneous register with the apertures which, in turn, cause interruptions in the magnetic field resulting in a flux change as the rotor rotates. This flux change creates an induced voltage, with a frequency proportional to the angular velocity of the rotor, in coils which encircle the pole pieces. The coils are connected so that induced voltages resulting from flux change caused by rotor rotation are additive, while induced voltages due to axial movement of the rotor relative to the sensing devices are subtractive. Because of the coil interconnections, the resulting output signal has a higher signal-to-noise ratio than usually obtainable, and has a frequency proportional to the angular velocity of the rotor and the rotating body attached thereto.

Thus, the present invention permits the use of a sensing device with different rotor diameters having a variety of rotor tooth or aperture spacings, and also provides a high signal-to-noise ratio insuring that the output signal is representative of the angular velocity of the rotating body.

DESCRIPTION OF THE PREFERRED EMBODIMENT

Figure 1:
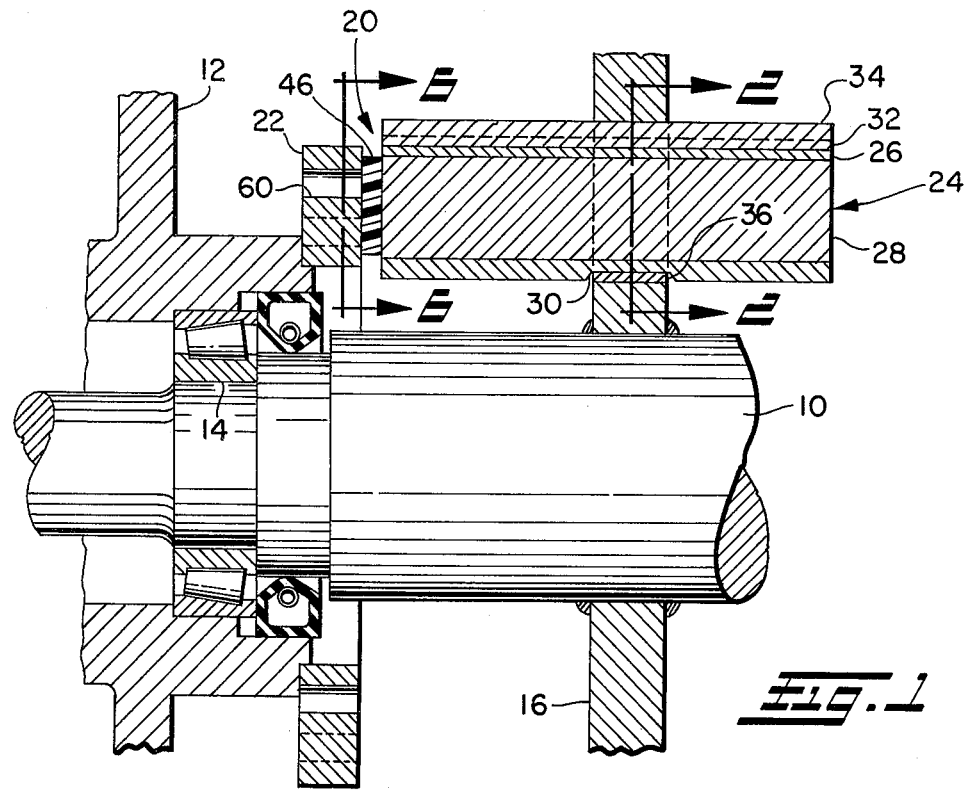
FIG. 1 is a longitudinal sectional view through a wheelaxle assembly and illustrates the assembled relationship in which the sensing device may be mounted.

Referring now to the drawings and more particularly to FIG. 1, the sensing device is illustrated in a typical anti-skid system environment wherein the device is mounted adjacent the wheel-axle assembly. Even though this device is shown in such an environment, it should be understood that the principles of the invention may be used in any environment in which a sensing device is employed for determining the velocity of a rotating body.

The wheel-axle assembly is comprised of a non-rotatable axle 10 on which a wheel 12 is rotationably supported by conventional radial thrust bearings 14. A conventional brake mechanism, not shown, may be mounted on a brake mounting flange 16 which is typically welded to the axle 10. The brake mechanism should be adaptable to cooperate with wheel 12 to brake the wheel as desired.

Cooperating with the wheel-axle assembly is the sensor assembly which is indicated generally by the numeral 20. The sensor assembly is comprised of a rotor 22 which is mounted on the wheel 12 and a sensing device 24 which is secured in a manner hereinafter described to brake mounting flange 16. It is apparent that as wheel 12 rotates, rotor 22 rotates relative to the sensing device 24 and the axle 10 producing a flux change which creates an induced voltage in sensing device 24.

Figure 2:
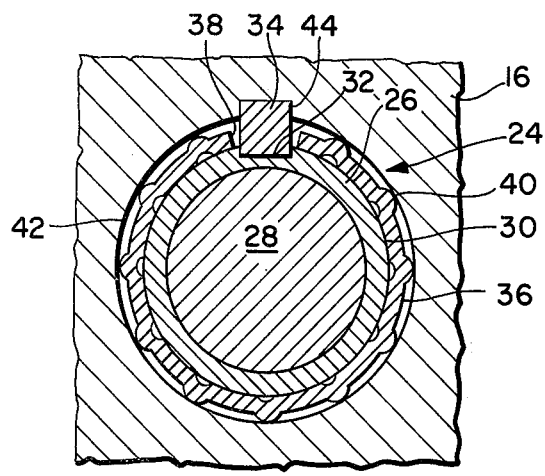
FIG. 2 is a sectional view taken along section-indicating lines 2—2 of FIG. 1 and shows the means used to mount the tubular sensing device.
Figure 5:
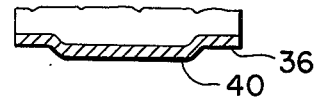
FIG. 5 is a sectional view taken along section-indicating lines 5—5 of FIG. 3 showing the projections on the outer periphery of the radial spring.
Figure 3:
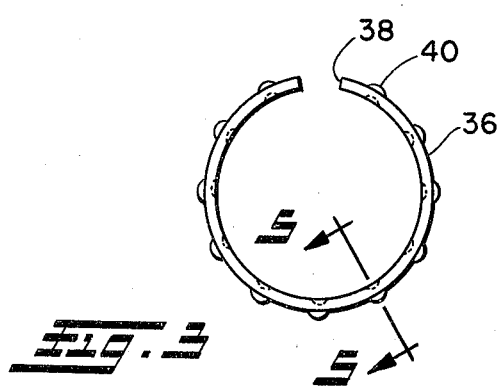
FIG. 3 is a front view of the radial spring used to mount the tubular sensing device.
Figure 4:
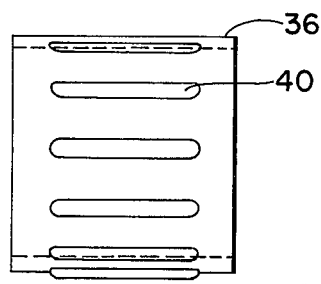
FIG. 4 is a side view of the radial spring shown in FIG. 3.

Referring now to FIGS. 1 and 2, the sensing device 24 comprises a tubular shell 26 which acts as a housing for the magnet subassembly 28 which will be described in detail later. The tubular shell 26 has a surface of reduced diameter, indicated generally by numeral 30, located approximately midway between its ends, and a keyway 32 which intersects the outer periphery of tubular shell 26 and is parallel to the axis of tubular shell 26. Keyway 32 is of the proper dimensions to receive and firmly secure a key 34 therein. A radial spring 36 is received on the tubular shell 26 and is positioned so as to be in contact with the reduced diameter surface 30. As shown in FIGS. 2 and 3, radial spring 36 is circular in cross section. A notch 38 is provided on the periphery of radial spring 36 to allow clearance for key 34 when the radial spring has been positioned on the reduced diameter surface 30. Radial spring 36 has a plurality of projections 40 on the periphery thereof. As shown in FIGS. 2, 3, 4 and 5, these projections 40 are substantially semi-circular in cross section and extend over a substantial portion of the length of radial spring 36 but terminate before reaching the ends of radial spring 36.

Referring again to FIGS. 1 and 2, the sensing device 24 is oriented so as to be received in an aperture 42 in the brake mounting flange 16. Aperture 42 is essentially circular in configuration and has a keyway 44 of the proper dimensions to receive and secure key 34. The sensing device 24 is inserted into aperture 42 until projections 40 located on the periphery of radial spring 36 firmly engage aperture 42 over the entire length of the radial spring. The use of the radial spring 36 permits axial movement of the sensing device 24 relative to axle 10, whereas angular movement of sensing device 24 is prevented by the engagement of key 34 in keyways 32 and 44.

To establish the proper air gap between the sensing device 24 and the rotor 22, a pair of gauge members 46 is provided. Each gauge member, which may be molded plastic, is positioned so as to be in contact with rotor 22 and the magnet sub-assembly 28. Since the only purpose of the gauge members 46 is to establish the proper air gap, the configuration of the gauge members may vary without affecting the operation of this invention.

Figure 8:
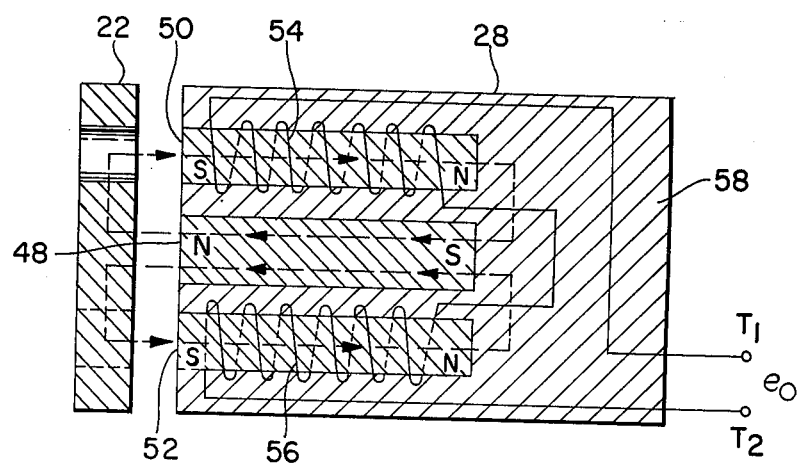
FIG. 8 is a schematic sectional view through the magnet subassembly illustrating the placement of the pole pieces relative to the magnetic flux source, and showing the corresponding directed flux paths and connection of the coil windings.

Referring now to FIG. 8, the magnet subassembly 28 includes a source of magnetic flux 48, such as a permanent magnet. Pole pieces 50 and 52, constructed of ferromagnetic material and circular in cross section, are located on either side of magnetic flux source 48 and extend toward rotor 22. The pole pieces 50 and 52 have electrical windings 54 and 56 respectively which are connected so that induced voltages which are 180° out of phase are additive and induced voltages which are in phase are subtractive. The induced voltages result in an output signal $e_o$ taken across output terminals $T_1$ and $T_2$. The source of magnetic flux 48, pole pieces 50 and 52, and windings 54, 56 are encapsulated with a suitable nonconductive potting material 58 to form an insulated housing.

Figure 6:
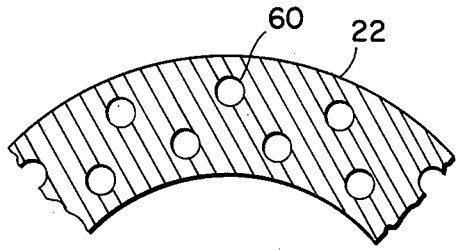
FIG. 6 is a sectional view taken along section-indicating lines 6—6 of FIG. 1 and shows the configuration of one embodiment of the rotor having apertures on two diameters.

As was previously mentioned, in the preferred embodiment the sensor assembly 20 provides an output signal with a frequency proportional to the angular velocity of the rotor 22, and thus the angular velocity of the wheel 12 to which the rotor is attached. This is accomplished by having a rotor 22 with a configuration which will interrupt the flux path of the magnetic flux source 48. In one embodiment of this invention, as shown in FIG. 6, the rotor 22 has a plurality of equally spaced apertures 60, typically in the form of circular holes, on two diameters. The apertures 60 are so oriented that those apertures on one diameter are staggered with respect to those on the other diameter, but the distances between apertures on one diameter and adjacent apertures on the second diameter are equal to each other. Sensing device 24 is oriented with respect to rotor 22 so that when either pole piece 50 or 52 is in register with an aperture 60 on rotor 22, the other pole piece is in register with the ferromagnetic surface of the rotor. This orientation is accomplished by the proper location of keyway 44 in brake mounting flange 16 so that when sensing device 24 is inserted into aperture 42 and key 34 is received in keyway 44, pole piece 50 is aligned with one aperture diameter while pole piece 52 is aligned with the second aperture diameter. Due to the staggering of the apertures on one diameter relative to those on the second diameter, and the equidistant spacing between adjacent apertures on the two diameters, this orientation results in the pole pieces being alternatively in register with the apertures which, in turn, results in a flux change that is 180° out of phase at pole pieces 50 and 52, when the rotor apertures 60 pass through the magnetic field created by the magnetic flux source 48. Such a flux change is this basis for the operation of the sensor assembly 20, as will be described later.

An inherent advantage of the sensor assembly 20 utilizing a rotor embodiment such as that shown in FIG. 6 is that it can be employed with a variety of rotor tooth or aperture spacings. In this embodiment of the invention, the rotor diameter does not affect operation of the sensor assembly 20. Proper operation of the sensor assembly 20 is dependent solely upon the correct orientation of the sensing device 24 with respect to rotor 22, and such orientation is determined by the location of keyway 44 in brake mounting flange 16. Thus, as long as pole pieces 50 and 52 can be properly aligned with the rotor apertures, the sensing device 24 can be used with a range of rotor diameters having various tooth or aperture spacings.

Operationally, as wheel 12 rotates, rotor 22, which is attached thereto, rotates relative to axle 10. As rotor 22 rotates, apertures 60 move tangentially past sensing device 24. As was previously explained, the location of apertures 60 on rotor 22 and the orientation of the sensing device 24 with respect to rotor 22, results in either pole piece 50 or pole piece 52 being in register with an aperture 60 while the other pole piece is in register with the ferromagnetic surface of the rotor. If pole piece 50 is in register with aperture 60 while pole piece 52 is in register with the surface of the rotor, there will be an increase in flux in pole piece 52 and a decrease in flux in pole piece 50. Since these flux changes and the resulting induced voltages are 180° out of phase and since the windings 54 and 56 are connected so that induced voltages 180° out of phase are additive, an output signal $e_o$ of magnitude equal to the sum of the induced voltages occurs across terminals $T_1$ and $T_2$. The frequency of output signal $e_o$ is proportional to the angular velocity of rotor 22.

Axial movement of the sensing device 24, due to road vibrations and/or component dimensional variations, also results in the production of induced voltages since such movement results in a change in the air gap between the sensing device 24 and the rotor 22. However, such a change in the air gap affects both of the magnetic circuits in the same manner. For example, if the air gap is decreased, an increase of flux of approximately the same magnitude occurs in both pole piece 50 and pole piece 52. Since these flux changes and the resulting induced voltages are in phase and since the winding 54 and 56 are connected so that induced voltage that are in phase are subtractive, the magnitude of the resulting output signal across terminals $T_1$ and $T_2$ due to this axial movement is negligible when compared to the magnitude of the output signal resulting from rotor rotation. This results in a high signal-to-noise ratio which is very desirable since such a signal will have a minimum of distortion and will give an accurate indication of the angular velocity of the wheel.

Figure 7:
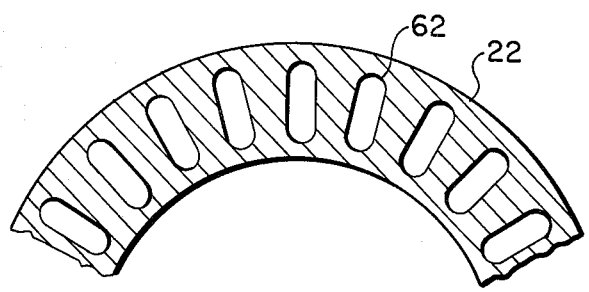
FIG. 7 is a sectional view similar to FIG. 6 and shows the configuration of another embodiment of the rotor having elongated slots on one diameter.

Another embodiment of this invention is shown in FIG. 7. This embodiment utilizes a rotor which also has apertures 62, however, the apertures 62 are centered on one diameter rather than two diameters. In addition, the apertures 62 are in the form of elongated slots, each slot being on an axis which intersects the center of rotor, however, such slot orientation with respect to the rotor center is not required.

This embodiment of the invention operates in a manner identical to that previously described for the first embodiment and therefore will not be discussed in detail. Proper operation depends upon the correct orientation of the sensing device 24 so that one pole piece is aligned with an aperture 62 while the other pole piece is aligned with the ferromagnetic rotor surface. Proper alignment is insured by the proper location of keyway 44 in brake mounting flange 16 so that only one pole piece is in register with an aperture 62 at any instant of time. Because of this orientation of the sensing device 24, the flux changes and resulting induced voltages in the pole pieces are 180° out of phase. Due to the interconnection of windings encircling these pole pieces, these induced voltages are additive to produce an output signal $e_o$ with a frequency proportional to the angular velocity of the wheel. The advantage of using a rotor with apertures 62 in the form of elongated slots rather than circular holes is that a slightly greater flux change occurs which, in turn, results in an output signal of greater magnitude yielding a higher signal-to-noise ratio. Such an output signal will give a more accurate indication of the angular velocity of the wheel.

As with the first embodiment, the diameter of the rotor has no effect on the operation of the sensor assembly 20. As long as aperture spacing is such that the center-to-center distance between piece poles is greater than one-half of the aperture spacing, the sensor assembly 20 will operate properly. Thus, the sensing device 24 can be utilized with a wide range of rotor diameters employing various aperture spacings.

Variations of the present invention will be apparent to those having ordinary skill in the art and the invention is limited only by the spirit and scope of the following claims.

I claim:

1. A rotation indication system for generating signals in response to the rotation of a body, said indication system comprising:

a rotor affixed to and rotatable with said body, said rotor having at least one array of apertures on the outer periphery thereof;

sensing means mounted proximate to said rotor and cooperating with said rotor to establish an air gap, said sensing means being retained in a tubular housing permitting proper orientation of said sensing means for use with various sizes of said rotor or various spacings of said apertures in said rotor;

means for mounting said sensing means, said mounting means permitting said tubular housing and said sensing means retained thereby to move axially relative to said rotor while preventing angular movement of said tubular housing, said tubular housing being parallel to the axis of said body and spaced a predetermined distance from said axis;

gauging means adjacent said sensing means, said gauging means projecting from said sensing means and being in contact with said rotor for limiting axial movement of said sensing means;

said sensing means comprising a source of magnetic flux, means for producing a split magnetic flux path, and coil means, said split magnetic flux path being interrupted by said apertures when said rotor is rotated producing a flux change, said flux change inducing an output signal in said coil means, said coil means being minimally responsive to any flux change caused by relative axial movement between said sensing means and said rotor.

2. The rotation indication system as defined in claim 1, wherein said rotor is an annular ferromagnetic member having a first array of equally spaced apertures on a first diameter and a second array of equally spaced apertures on a second diameter, said first and second arrays being so oriented relative to each other such that the distances between apertures in said first array and adjacent apertures in said second array are equal.

3. The rotation indication system as defined in claim 1, wherein said rotor is an annular ferromagnetic member having an array of equally spaced elongated slots therein, said slots having parallel sides and having one end thereof adjacent the outer periphery of said rotor.

4. The rotation indication system as defined in claim 1, wherein said means for mounting said sensing means comprises:

a key received in a first keyway formed in the outer periphery of said tubular housing for said sensing means, said key being positioned in said first keyway so as to be parallel with the axis of said tubular housing, said key also being engageable with a second keyway provided in a member which supports said sensing means, placement of said second keyway being predetermined to insure the proper orientation of said sensing means relative to said rotor; and a radial spring positioned on the outer surface of said tubular housing so that the inner surface of said radial spring is in contact with said outer surface of said tubular housing, said radial spring being substantially circular in cross section and having projections on the outer periphery thereof, said projections being engageable with an aperture in said member which supports said sensing means, said aperture in said supporting member being in communication with said second keyway.

5. The rotation indication system as defined in claim 1, wherein said means for producing a split magnetic flux path includes first and second pole pieces which produce a first and a second magnetic circuit, said first and said second pole pieces being positioned relative to said source of magnetic flux so as to be parallel to and equidistant from said source, and said coil means includes a first winding wound about a portion of said first pole piece and a second winding wound about a portion of said second pole piece, said first and second windings being interconnected such that induced voltages of opposite polarity across said windings are additive whereas induced voltages of the same polarity across said windings are subtractive.

6. The split magnetic flux path producing means as defined in claim 5, wherein said first and second pole pieces are oriented relative to said rotor such that said first and second pole pieces are alternatively in register with said apertures in said rotor, said orientation preventing simultaneous registration of said pole pieces with said apertures in said rotor, said orientation resulting in the production of induced voltages of opposite polarity in said windings, said induced voltages being additive to produce an output signal.

7. The split magnetic flux path producing means as defined in claim 5, wherein said first and second pole pieces are contructed of ferromagnetic materials and serve as portions of said split magnetic flux path for said source of magnetic flux.

8. The split magnetic flux path producing means as defined in claim 5, wherein said source of magnetic flux is a permanent magnet.

9. The split magnetic flux path producing means as defined in claim 5, wherein said first and second pole pieces are substantially circular in cross section to assist in tightly winding said windings thereabout.

10. A signal generator providing a signal representative of the angular velocity of a rotating body, said signal generator comprising a rotor connected to and rotatable with said body, said rotor being of ferromagnetic material and having at least one array of apertures on the outer periphery thereof, sensing means mounted proximate to said rotor establishing an air gap therebetween, said sensing means including a magnetic flux source, means for producing a split magnetic flux path, and coil means, said split magnetic flux path producing means including first and second pole pieces positioned relative to said magnetic flux source so as to be parallel to and equidistant from said magnetic flux source, said sensing means being retained by retaining means in a tubular housing permitting axial and angular movement of said tubular housing and said sensing means retained thereby when proper orientation of said sensing means is being established for different rotor sizes and/or aperture spacings, said tubular housing being parallel to the axis of said body and spaced a predetermined distance from said axis, said proper orientation of said sensing means occurring when said first and said second pole pieces are alternatively in register with said apertures in said rotor resulting in the interruption of said split magnetic flux path by said apertures when said rotor is rotated causing a flux change, said proper orientation of said sensing means being retained by means for mounting said sensing means permitting axial movement of said tubular housing and said sensing means retained thereby while preventing angular movement of said tubular housing after said proper orientation of said sensing means is established, said axial movement being limited by gauging means adjacent said rotor, said coil means being responsive to said flux change to produce an output signal, said coil means being minimally responsive to any flux change resulting from relative axial movement between said sensing means and said rotor.

* * * * *